United States Patent [19]

Mecalf

[11] Patent Number: 5,639,056
[45] Date of Patent: Jun. 17, 1997

[54] DISPLAY PEDESTAL

[75] Inventor: Derek N. G. Mecalf, LaGrange Park, Ill.

[73] Assignee: Athena Industries, Inc., LaGrange, Ill.

[21] Appl. No.: 360,382

[22] Filed: Dec. 21, 1994

[51] Int. Cl.$^6$ .................................................. F16M 13/00
[52] U.S. Cl. ................... 248/523; 248/163.1; 248/188.7; 248/519
[58] Field of Search .......................... 248/163.1, 188.7, 248/188.8, 519, 523, 524, 525

[56] References Cited

U.S. PATENT DOCUMENTS

| | | | |
|---|---|---|---|
| 1,379,969 | 5/1921 | Dawson | 248/188.7 |
| 1,679,758 | 8/1928 | Bauersfeld et al. | |
| 2,470,397 | 5/1949 | Harter | |
| 2,913,208 | 11/1959 | McKinley | |
| 3,078,063 | 2/1963 | Frankl | 248/188.7 |
| 3,160,382 | 12/1964 | Lee | |
| 3,286,964 | 11/1966 | McMahon, Jr. et al. | 248/188.7 |
| 3,307,814 | 3/1967 | Bogar, Jr. | 248/188.7 |
| 3,565,378 | 2/1971 | Svenson | |
| 3,937,434 | 2/1976 | Tacke | |
| 4,060,214 | 11/1977 | Metcalf | 248/188.7 |
| 4,448,378 | 5/1984 | Binfare | |
| 4,807,838 | 2/1989 | Anderson | 248/188.8 |
| 4,825,586 | 5/1989 | Coppedge | 248/523 |
| 4,898,353 | 2/1990 | Jih et al. | 248/188.7 |
| 5,014,461 | 5/1991 | vom Braucke et al. | 248/523 |
| 5,236,167 | 8/1993 | Tai et al. | 248/188.7 |

FOREIGN PATENT DOCUMENTS

| | | | |
|---|---|---|---|
| 0045151 | 2/1982 | European Pat. Off. | 248/188.8 |
| 2703683 | 8/1978 | Germany | 248/188.7 |

*Primary Examiner*—Leslie A. Braun
*Assistant Examiner*—Richard M. Smith
*Attorney, Agent, or Firm*—McCaleb, Lucas & Brugman

[57] ABSTRACT

A unitary merchandise display pedestal having a plurality of tubular co-planar legs of polygonal cross section extending radially from a central hub formed by a pair of horizontal parallel spaced weld plates welded to a vertical tubular sleeve post for supporting a vertical mast; the tubular legs being positioned so that opposite exterior corners of their polygonal cross sections engage raised weld beads on the pair of weld plates whereby to produce efficient resistance welding of the legs and weld plates; resistance welds are also employed to secure the tubular post to the lowermost weld plate.

10 Claims, 3 Drawing Sheets

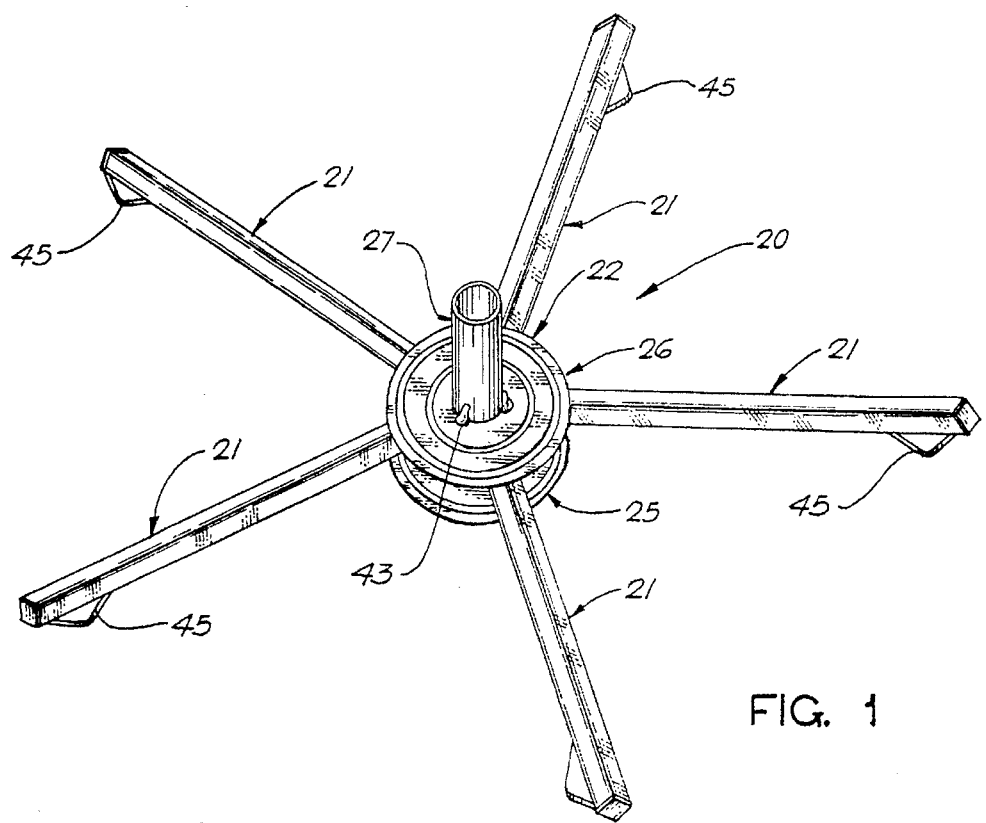
FIG. 1
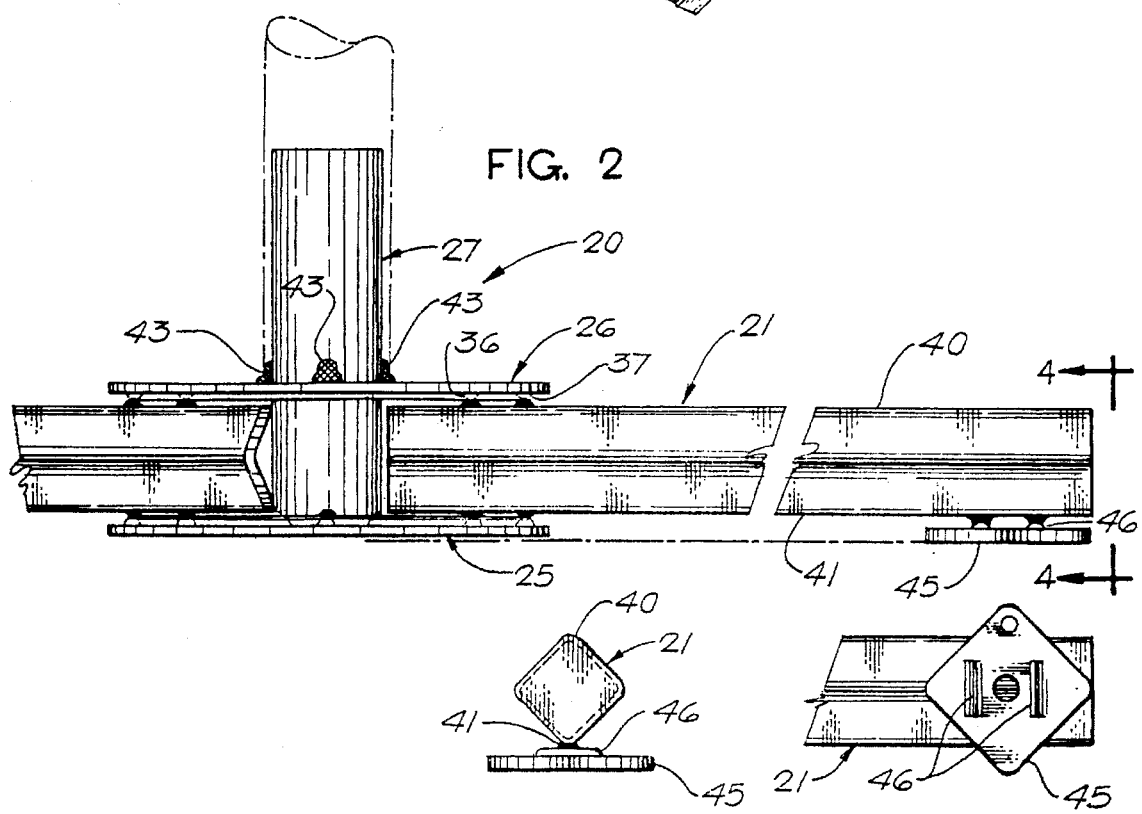
FIG. 2
FIG. 4
FIG. 3

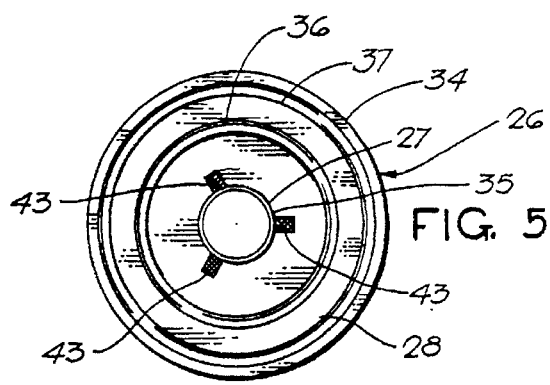
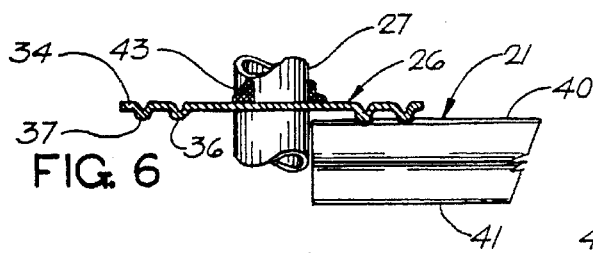
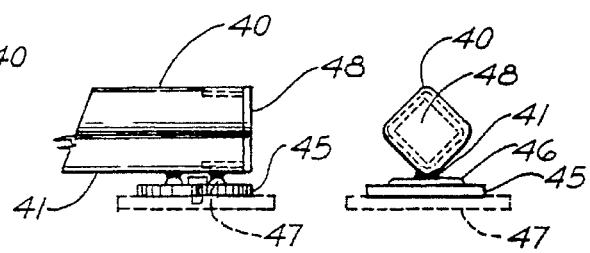
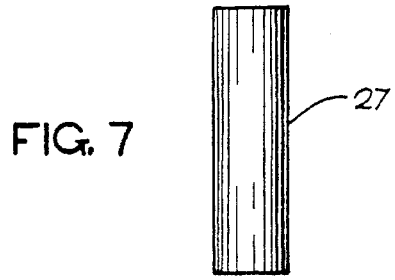
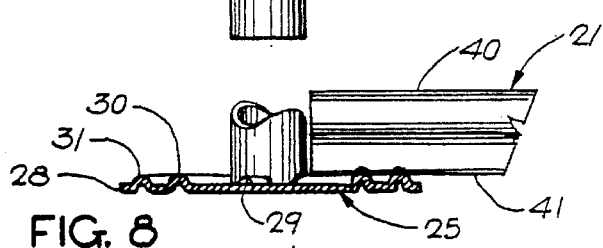
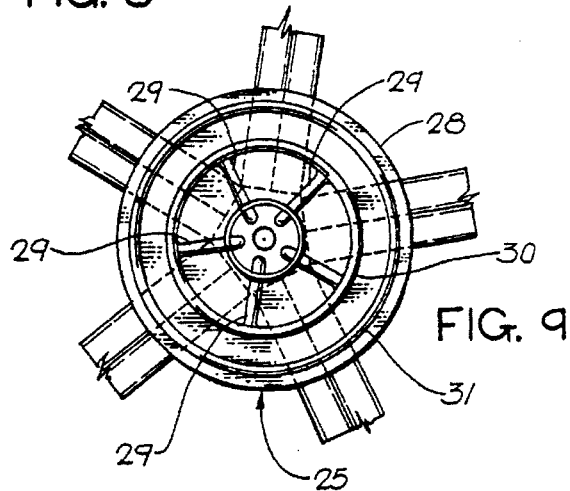

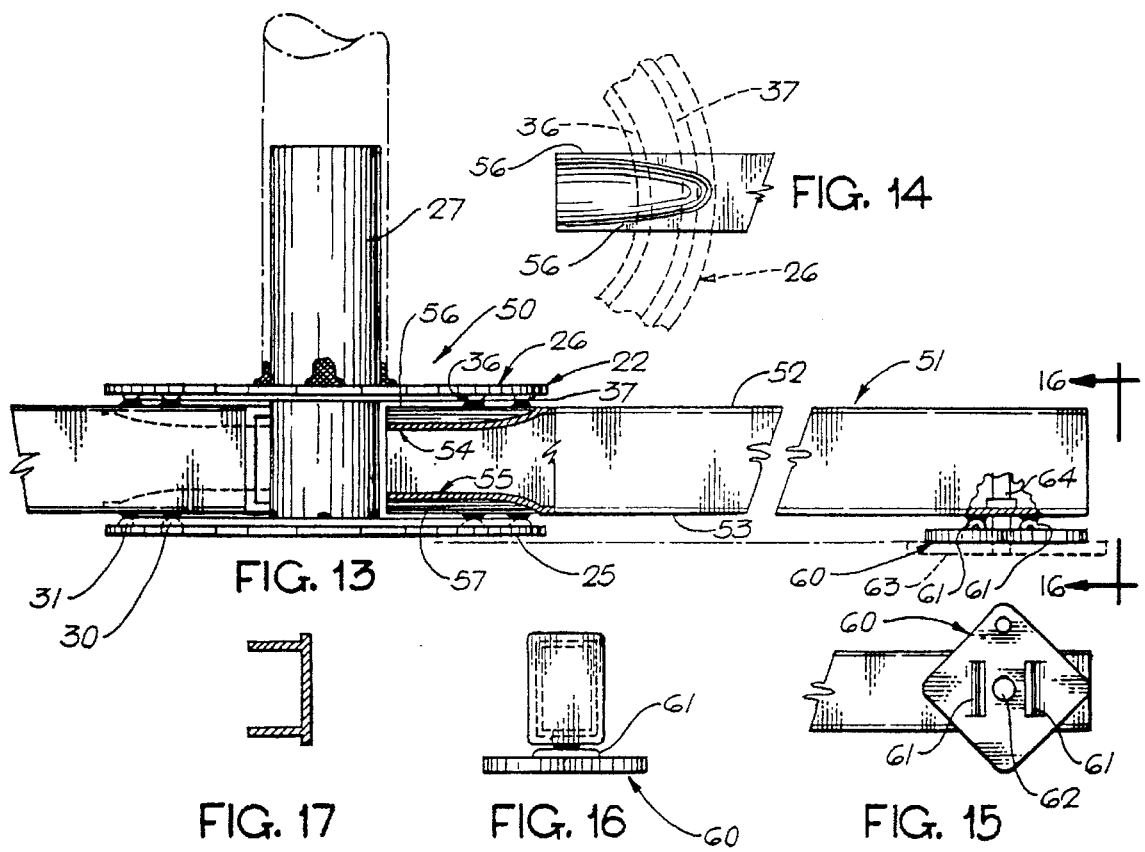
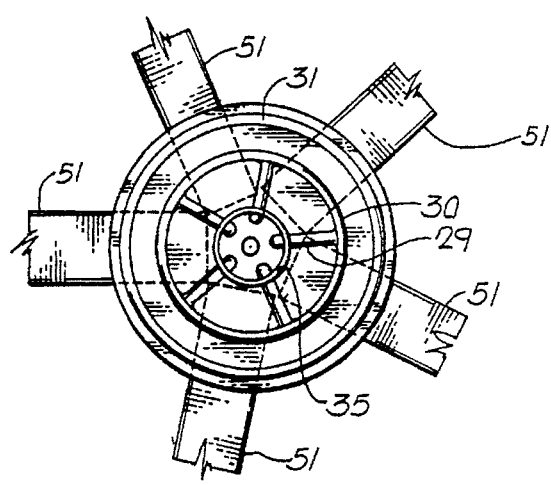
FIG. 13  FIG. 14  FIG. 15  FIG. 16  FIG. 17  FIG. 18

DISPLAY PEDESTAL

This invention is concerned with merchandise displays and more particularly it is directed to a structural combination for an improved floor display pedestal or base supportive of a vertical display mast.

A wide variety of pedestals for supporting furniture such as chairs, tables, lamps, display racks and similar uses are known from the prior art to generally comprise a plurality of ground engaging legs extending outwardly of a central hub which accommodates an upright support. Despite the wealth of such prior known structures, a genuine need for a simplified, sturdy, dependable pedestal structure affording improved economies of manufacture and assembly as well as versatility of use and attractive appearance remains.

BRIEF SUMMARY OF THE INVENTION

The invention hereof is directly to an improved operationally dependable pedestal structure comprising a simplified assembly of parts which is particularly suited to support a vertical mast for displaying and storing merchandise, although such is equally suited for other allied uses. The pedestal hereof is especially distinguished by its simplified structural combination of parts leading to marked economies of production and ease of assembly without sacrificing its utility, operation dependability, eye appeal, improved structural integrity and strength. In brief the pedestal hereof comprises an integrated combination of parts comprising a plurality (three or more) like linear tubular and co-planar arrayed support legs radiating from a central hub having a tubular sleeve or post for supporting a vertical mast; such parts being welded into a unified structure including parallel spaced weld plates or washers of the hub which extend radially over and under the inner radial end portions of the several legs thereof. Each leg carries a ground engaging foot adjacent it's outer radial end. Importantly the tubular legs are of polygonal cross section oriented in assembly to engage the weld plates with opposing external or diametrically opposed corners of their exterior polygonal configuration whereby to promote positive weld connection with the weld plates in assembly.

It is a primary object of this invention to provide an improved, unitary pedestal structure for supporting a vertical mast.

Another important object of this invention is to provide an attractive display pedestal distinguished by a simplified combination of elements productive of economies of production and assembly.

Still another important object of this invention is to provide a display pedestal for supporting a vertical mast which embodies a plurality of co-planar, relatively lightweight, tubular legs of polygonal cross section radiating from a central hub unified with the legs by efficient resistance welds.

A still further object of this invention is to provide a display pedestal, as set out in the next preceding object, in which the tubular legs are anchored at their radially inner ends between a pair of parallel weld plates affixed to exterior corners of the legs.

An additional important object of this invention is to provide a rugged pedestal support for a vertical mast in which tubular legs of quadrangular cross section have corresponding ends thereof welded to and between a pair of parallel weld plates or washers formed with projecting weld beads to provide resistance welds between the weld beads and exterior corner portions of the legs.

Having described this invention, the above and further objects, features and advantages thereof will be recognized and understood from the hereinafter described preferred and modified embodiments thereof, illustrated in the accompanying drawings and representing the best mode presently contemplated for enabling those skilled in the art to practice this invention.

IN THE DRAWINGS

FIG. 1 is a perspective view of a display pedestal according to this invention;

FIG. 2 is an enlarged partial side elevational view with parts thereof foreshortened, of the pedestal shown in FIG. 1;

FIG. 3 is a bottom plan view of an outer end portion of a leg with attached foot plate as shown in FIG. 2;

FIG. 4 is an end elevational view of a pedestal leg taken substantially from vantage line 4—4 of FIG. 2 and looking in the direction of the arrows thereon;

FIG. 5 is a top plan view of the top weld washer and tubular sleeve shown in FIGS. 1 and 2;

FIG. 6 is a partial side elevational view of the weld washer and sleeve shown in FIG. 5;

FIG. 7 is a side elevational view of the mast supporting tubular sleeve shown partially in FIG. 6;

FIG. 8 is a side elevational view of the assembled bottom weld washer, tubular sleeve and one leg, partially shown thereat;

FIG. 9 is a top plan view of the assembled bottom weld washer and tubular sleeve with the several pedestal legs foreshortened and indicated by dotted lines therein;

FIG. 10 is a partial side elevational view of an outer end portion of a tubular pedestal leg with an end cap and ground engaging foot plate having an anti-skid pad indicated by dotted lines;

FIG. 11 is an end elevational view of the assembly illustrated in FIG. 10;

FIG. 12 is a full cross sectional view of an end cap for closing over the outer open end of a pedestal leg, as shown in FIG. 10;

FIG. 13 is a partial, enlarged side elevational view, similar to FIG. 2, but modified to include tubular legs of rectangular cross section;

FIG. 14 is a partial top plan view of tubular leg according to FIG. 13 and indicating a portion of the top weld plate in dotted lines;

FIG. 15 is a partial bottom plan view of an outer end portion of the pedestal leg, as shown in FIG. 13, with attached foot plate, similar to FIG. 3;

FIG. 16 is an end elevational view of the leg shown in FIG. 13, taken substantially from vantage line 16—16 of that figure;

FIG. 17 is a full vertical cross sectional view of a rectangular end cap for closing over the outer ends of modified pedestal legs as shown in FIG. 13; and FIG. 18 is a top plan view of the bottom weld plate shown in FIG. 13, and indicating the several pedestal legs in dotted lines, similar to FIG. 9.

DESCRIPTION OF THE PREFERRED EMBODIMENT

Turning now to FIGS. 1–12 it will be recognized that the display pedestal of this invention, indicated generally at 20 in FIGS. 1 and 2, comprises a plurality of like, tubular, co-planar, linear ground engaging legs 21 radiating from a central hub assembly 22 adapted to coaxially received and support a vertical display mast (not shown).

In the particular embodiment shown in FIG. 1, there are five like tubular legs 21. However, three or more such legs can be used to provide a stable pedestal according to this invention. In any event the five illustrated legs are circumferentially evenly spaced at 72° intervals about hub assembly 22 shown in FIG. 9. Each leg is a length of hollow metal tubing having a polygonal cross section, preferably square cross section as shown or rectangular as in the modified structure of FIGS. 13–18 to be described hereinafter. Legs 21 are of uniform length and radiate equal distances from the hub structure 22 in assembly.

Hub assembly 22 is composed of three parts namely, two metal weld discs or washers 25 and 26 and a single relatively short tubular sleeve or post 27, shown herein as cylindrical (see FIGS. 1, 2 and 5–9) to accommodate a tubular mast indicated in dotted lines in FIG. 2.

As best shown in FIG. 9, the bottom or lower disposed weld washer 25 preferably is formed as a stamped circular metal disc 28 having a plurality of uniformly spaced, relatively short, central, radially extending weld beads 29 stamped in disc 28 to protrude outwardly from an operationally upper face thereof. In addition, disc 28 also has two concentrically related circular stamped weld beads 30, 31 located radially outwardly of the radially extending beads 29, also protruding upwardly from the upper face of disc 28.

In similar fashion the other or top weld washer 26 is formed as a circular metal disc 34 having the same diameter as disc 28, but with an enlarged central circular opening 35 for passage of sleeve 27 therethrough. Like disc 28, disc 34 has a pair of concentrically related circular weld beads 36 and 37 stamped therein to protrude from the operationally lower or bottom face thereof (see FIGS. 5 and 6).

To interconnect the several legs with the hub assembly 22, the tubular sleeve 27 is positioned coaxially over the bottom weld washer 25 with its bottom end engaging the radially extending weld beads 29. The bottom end of the tube is then resistance welded with beads 29 by pressing the sleeve 27 against the weld beads while applying low voltage, high amperage electrical energy thereto according to known practice. This operation brings about plural welds at the intersection of the lower end of the sleeve with the raised beads 29 and disc 28.

The several legs 21 are then placed over the weld washer 25, traversing the concentric beads 30, 31 thereof and positioned in desired arcuately spaced array with diagonally opposed exterior corners 40 and 41 thereof vertically aligned as shown best in FIG. 2. In practice it is best to utilize a fixture to locate and hold the several legs in position over the bottom weld washer 25 so that corners 41 engage the concentric weld beads 30 and 31. The top weld washer 26 is then centered over the tubular sleeve 27 so that the concentric weld beads 36, 37 on the lower face thereof contact the uppermost diagonal corners 40 of the several legs 21. By applying pressure to the washer and electrically energizing the same resistance welds are formed between the concentric weld beads of the two washers and the leg corners to effect a unified structure. Due to the presentation of the exterior corners of the tubular legs to the several weld beads of the weld washers point contact is effected therebetween to provide highly efficient and sound resistance welding between the legs and washers.

Because of the lack of consistent uniformity in the manufacture of cylindrical tubing, the sleeve or post 27 is not always of uniform roundness for a given nominal tube size. Consequently, the central opening 35 in the top weld washer 26 is purposely of a diameter just slightly larger than the nominal outside diameter of the sleeve post 27. This provides sufficient clearance between the weld washer opening 35 and the sleeve post to facilitate easy assembly of the top weld washer over post 27 while accommodating normal exterior variations in the roundness thereof. Since this radial clearance between the weld washer opening 35 and the sleeve post 27 might permit the latter to wobble laterally, particularly when carrying a vertical mast underload from display merchandise, it is best to weld the washer 26 at opening 35 to the exterior of post 27. This is best accomplished by three spot welds 43 as shown in FIGS. 1, 2, 5 and To complete the assembly of the pedestal, each of the legs 21 is fitted with a ground engaging foot plate 45 adjacent its outer end; preferably comprising a small metal plate having raised weld beads 46,46 positioned in normal relation to the longitudinal axis of each leg with the several plates aligned co-planar in assembly so that its weld beads engage the bottom corner edge 41 of an associated leg.

Resistance welding is again employed to attach each of the metal foot plates 45 to the lower corner of its associated diagonally oriented leg as seen in FIG. 4. Such foot plates may carry external non-skid covers indicated at 47 in FIGS. 10 and 11 or be fitted with casters, rollers or other fittings as desired.

Suitable plastic caps 48 are fitted or over the open outer ends of each of the several legs 21 as shown in FIGS. 10—12 and the entire pedestal assembly is readily adapted to be exteriorly finished by metal plating, paint or other covering materials according to conventional practice whereby to achieve an attractive end product.

Attention is now directed to FIGS. 13–18 of the drawings wherein a modified pedestal structure 50 is illustrated which is preferred for heavy duty pedestal loads.

It will be recognized that pedestal 50 includes the hub structure 22 previously described comprising weld washers 25, 26 and tubular sleeve 27 inclusive of weld beads 29, 30 and 31 on the bottom washer 25 and concentric beads 36 and 37 on the top washer or disc 26. If desired, the tubular sleeve 27 of this modified pedestal may be of larger diameter to accommodate a larger diameter mast for heavier loads than the first described pedestal 20 hereof. If a larger diameter post is employed then the central opening 35 of washer 26 accordingly will be larger. Aside from such dimensional changes, however, the hub structure of pedestal 50 is the same as the previously described hub of FIG. 1 and 2.

The major modification of pedestal 50 occurs in the several tubular legs 51 thereof which are rectangular in cross section oriented with long axes vertical as opposed to the square cross section of the previously described legs 21. With this change it will be noted that the inner end portions of legs 51 have their top and bottom walls 52 and 53, respectively, indented or crimped inwardly as at 54 and 55 (see FIG. 13). This forms generally parallel narrowed corner portions 56, 56 and 57, 57 along the upper and lower margins of the top and bottom inner end portions, respectively. Consequently, when such corners are engaged with the several weld beads of the two weld plates and appropriate electrical energy applied efficient and sound resistance welds result in accordance with that objective of this invention. If preferred an alternate welding procedure may be used wherein the legs are first welded to the bottom washer and subsequently to the top washer to insure point weld contact depending on the size and area of the corner portions 56 and 57 in this embodiment.

At the outer ends of the several legs 51, foot plates 60 are provided beneath their bottom walls 53 as shown best in FIGS. 13, 15 and 16. It will be noted that foot plates 60 are generally square in plan and include a pair of raised parallel weld beads 61, 61 and a central opening 62 (see FIG. 15). Such openings are receptive of a caster stem or anti-skid pad fitting 63 having a stem 64 threaded into leg 51 as indicated.

From the foregoing, it is believed that those familiar with the art will readily recognize and appreciate the novel advancement of the present invention and will understand that while the same has been hereinabove described in association with particular embodiments thereof illustrated in the accompanying drawings, such are susceptible to various changes, modifications and substitutions of equivalents without departing from the spirit and scope of the invention which is intended to be unlimited by the foregoing except as may appear in the following appended claims.

The embodiments of the invention in which an exclusive property or privilege is claimed are defined as follows:

1. A unitary merchandise display pedestal comprising:
    a plurality of like, linear, tubular legs of polygonal cross section;
    a central hub assembly for supporting said legs comprising a vertically oriented tubular post and a pair of horizontal, vertically spaced weld plates fixed to said post;
    one of said weld plates abuttingly engaging the lower end of said post and the other of said weld plates concentrically surrounding said post;
    said weld plates being formed with plural, raised weld beads protruding from opposing faces thereof;
    said legs being arranged to extend radially outwardly from said hub assembly with radial inner ends thereof located adjacent said post between said plates and with diagonally opposed corners of polygonal cross sections engaging said weld beads with point contact for effecting positive resistance welded connection therewith.

2. The display pedestal of claim 1, wherein said legs are coplanar.

3. The display pedestal of claim 1, wherein the weld beads of each of said weld plates comprises a pair of concentrically related circular beads disposed to effect welded connection with said corners of said legs.

4. The display pedestal of claim 1, wherein said legs are uniformly arcuately spaced about said hub assembly.

5. The display pedestal of claim 1, wherein said tubular legs have a quadrangular cross section and are oriented between said plates so that diagonally opposite exterior corners thereof engage said beads for efficient resistance welded connection therewith.

6. The display pedestal of claim 1, wherein said post is cylindrical tubing and its lower end engages radially extending, arcuately spaced linear weld beads formed on the upper face of a lowermost one of said plates for effecting resistance welded connection therewith.

7. The display pedestal of claim 1, wherein there are five of said tubular legs equally spaced about said hub assembly.

8. The display pedestal of claim 1, wherein said weld beads on a lower disposed said one of said plates comprises circumferentially spaced linear beads radiating outwardly from adjacent the center of said one of said plates; said linear beads being disposed to engage the bottom end of said post with point contact to effect plural circumferentially spaced resistance welded connections therewith.

9. The display pedestal of claim 1, wherein said legs are of rectangular cross section and have opposing planar wall portions adjacent said inner ends thereof indented inwardly to form parallel, outstanding, separated external corners capable of point engagement with said weld beads for effecting efficient resistance welded connection thereto.

10. The display pedestal of claim 1, and a planar foot plate associated with each of said legs; each said foot plate having raised weld beads aligned normal to the longitudinal axis of an associated leg to provide point engagement with a bottom external corner of said associated leg for efficient resistance welded connection therewith; the foot plates connected to the several legs being co-planar.

* * * * *

UNITED STATES PATENT AND TRADEMARK OFFICE
CERTIFICATE OF CORRECTION

PATENT NO. : 5,639,056
DATED : 6/17/97
INVENTOR(S) : Derek N. G. Metcalf

It is certified that error appears in the above-indentified patent and that said Letters Patent is hereby corrected as shown below:

ON THE TITLE PAGE:

Item [75] Inventor should read -- Derek N. G. Me_tcalf.

Col. 4, line 14, after "and", insert -- 6 --;

Col. 5, line 36, after "of" insert -- said legs --.

Signed and Sealed this

Twenty-eighth Day of October, 1997

Attest:

BRUCE LEHMAN

Attesting Officer

Commissioner of Patents and Trademarks